April 18, 1967   W. HALPERN   3,314,314
BORING TOOL
Filed Feb. 9, 1966
FIG. 1
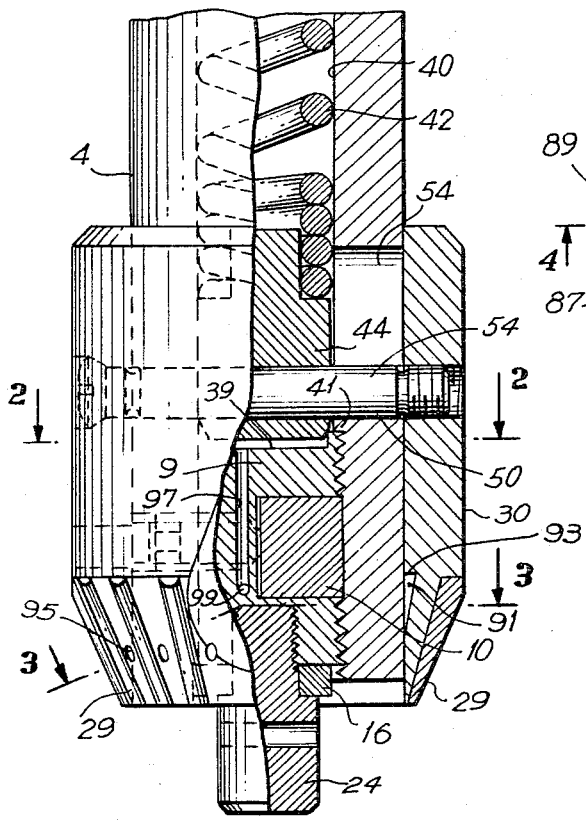
FIG. 2
FIG. 3
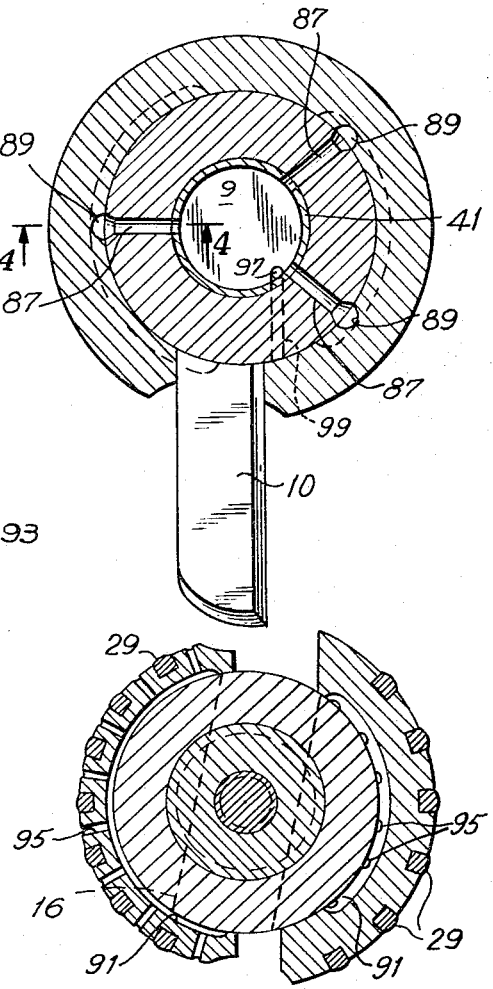
FIG. 4
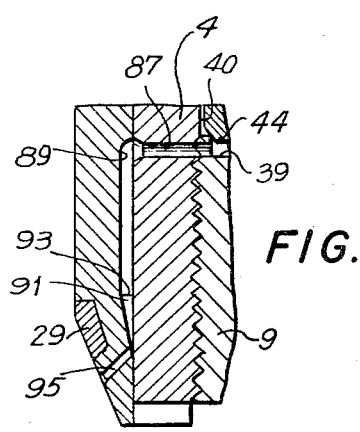
INVENTOR.
WILLIAM HALPERN
BY
Curtis, Morris & Safford
ATTORNEYS United States Patent Office 3,314,314
Patented Apr. 18, 1967

3,314,314
BORING TOOL
William Halpern, Haviland Road,
Harrison, N.Y. 10528
Filed Feb. 9, 1966, Ser. No. 526,110
11 Claims. (Cl. 77—58)

This invention is related to that disclosed in my co-pending patent application, Ser. No. 455,447, filed May 13, 1965. Both of the inventions relate to boring tools, particularly those tools for enlarging bores or holes in workpieces. The present invention is directed to improvement features which broaden the uses and applications of the boring tools, with assurance that fully satisfactory operation can be attained.

An object of these inventions is to provide improved boring tools and the like. Another object is to provide improved metal working tools which are adapted to form holes of varying diameters and depths and with very accurate control. Another object is to provide efficient and dependable boring tools which may be used to enlarge cylindrical holes of relatively great depth and to maintain close tolerances from the standpoint of the location, size, and condition of the surface of the wall of the finished hole. Another object is to provide improved boring tools which are versatile in the senses that a single tool may produce holes of a wide range of diameters and depths. A further object is to provide tools of the above character which will produce holes of great accuracy, even though an original hole has been formed which is somewhat inaccurate in its location or size, or the relative angle of its axis.

It is an object of the present invention to provide efficient and dependable means for supplying coolant to the desired zones during the boring operations. Another object of the present invention is to provide an improved support arrangement for the tool. A further object of the present invention is to overcome difficulties which may be encountered under certain conditions of operation with the boring tool disclosed in the above-identified co-pending application.

The above and other objects will be in part obvious and in part pointed out below.

In the drawings in which one embodiment of the invention is shown:

FIGURE 1 is a side elevation of one embodiment of the invention, with the right-hand portion broken away in vertical section;

FIGURES 2 and 3 are sectional views respectively on the line 2—2 and 3—3 of FIGURE 1; and FIGURE 4 is a sectional view on the line 4—4 of FIGURE 2.

Except as specifically disclosed herein, the illustrative embodiment of the present invention is identical with that of the above-identified co-pending application, and corresponding parts are similarly numbered.

Referring to FIGURE 1 of the drawings, a boring tool 2 has a boring bar 4 with an axial bore 40 extending throughout its length. The lower end of bore 40 is threaded, and screwed therein is a screw block or plug 9 which closes the end of bore 40 and forms therewith a structure which in effect is integral. Mounted upon the lower end of boring bar 4 is the boring assembly 8 having a boring bit 10 (see also FIGURE 2) which is mounted in a transverse slot 12 in the boring bar and the screw plug 9 is clamped in adjusted position by a set screw 14. Boring bit 10 has a cutting edge terminating at a circular release. Mounted on the bottom end face 15 of boring bar 4 is an end-cutting boring bit or trueing bit 16 having a rectangular bar portion 18 which is snugly received in a slot 20 in the boring bar and has an end bit having a cutting edge. End-cutting boring bit 16 is clamped in place by a headed screw 24 which (FIGURE 1) extends through a central bore in the bar portion 18 and is threaded into an axial bore in the end of screw plug 9.

Mounted upon and surrounding the lower end of boring bar 4 is a cylindrical nose cone 30 which is tapered at its lower end to form a frusto-conical support structure 32.

Nose cone 30 is formed of a steel cylindrical sleeve 27 which is of uniform radial dimensions, except that it has a frusto-conical lower end. A large number of elongated carbide inserts 29 are snugly received in slots in the frusto-conical surface and are cemented in place. Each of the inserts 29 presents a convex surface which is a segment of a cylinder, and these surfaces converge downwardly so as to provide support around a frustrum of a cone having predetermined inner and outer radii. The nose cone has two diametrically opposite slots 34 and 36 (see FIGURE 3), slot 34 extending from the bottom of the cone upwardly beyond boring bit 10, and slot 36 extending the full length of the cone. These slots permit free vertical movement of the nose cone with respect to the boring bit, and slot 36 also guides and discharges the chips upwardly from the workpiece.

Within bore 40 (FIGURE 1) in the boring bar, there is a compression coil spring 42 which rests at its lower end upon the plug or plunger 44 and which is held under compression at its upper end by an adjustable screw plug (not shown) threaded into the top of bore 40. Extending through a transverse hole in plunger 44 is a connector pin 50 which has a head at the left and is threaded at its right-hand end and is screwed into a threaded hole in nose cone 30. The boring bar has slots 54 in which pin 50 is positioned and which permit plug 44, pin 50 and the nose cone to move axially with respect to the boring bar. However, these elements are shown in their rest positions to which they are urged by spring 42.

Plug 9 has a top flange 41 surrounding a well 39, and plunger 44 has a tapered lower end which nests on the top of the flange. Hence, plunger 44 acts as a valve to close the top of well 39 and cut off the supply of coolant to the ports of bores 97 and 87. During operation, coolant is received through a fluid-type coupling at the top of the boring bar and is delivered from the bottom of bore 40 to the workpiece when a boring operation is being carried on. Accordingly, extending from well 39 (FIGURES 2 and 4) radially outwardly through flange 41 of plug 9 and the wall of the boring bar, there are three bores 87, and extending downwardly therefrom along the inside wall of the nose cone 30 there are three semicylindrical slots 89. Slots 89 extend to two arcuate chambers 91 which are formed below ledges 93. Extending radially outwardly and downwardly from the lower portions of chambers 91 respectively between each insert 29 and the next are coolant-discharge passageways 95. Hence, well 39, bores 87, slots 89, chambers 91 and passageways 95 provide for delivering coolant from above plug 9 in bore 40 to the zone of the inserts and it then flows to the trueing bit 16. Aso, vertical bore 97 (FIGURES 1 and 2) extends from well 39 downwardly through plug 9 and connects with a horizontal bore 99 which extends through the plug and the wall of boring bar 4 and delivers coolant directly ahead of the cutting edge of the boring bit 10. The outlet port of bore 99 may be opened and closed by the movement of the nose cone.

As indicated above, when plunger 44 is in the rest position, spring 42 urges the plunger against the top of plug 9 so that it closes the top of the well, thus cutting off the supply of coolant to bores 97 and 87. However, when the nose cone is moved with respect to bar 4 from this rest position, plunger 44 and plug 9 are moved apart, thus uncovering the ports of bores 97 and 87.

The diameter of bore 40 and the outer diameter of plunger 44 are such that the coolant may pass downwardly between the plunger and the wall of the bore. Hence, when the ports of bores 97 and 87 are uncovered, the coolant which is received at the top of bore 40 is delivered through bores 87 and 97 to the respective zones, as explained above.

As indicated above, the details of construction and operation of the boring tool shown in the drawings is as set forth in my co-pending application which is incorporated herein, and access may be had thereto for such details as are desired. This tool is used to enlarge a hole in the workpiece from a size within the range of the trueing bit 16 to the range of the boring bit 10. As the tool moves toward the workpiece, it is aligned as nearly as possible with the hole. However, the trueing bit permits variations in the size of the original hole and in the trueness of alignment of the hole axis to the axis of the boring bar 4. Trueing bit 16 first engages the workpiece and produces a hole having the predetermined true diameter and axis. That hole is of a radius at least as great as the minimum radius of the frustrum of the cone of the outer surfaces of inserts 29. Hence, as the trueing bit produces its hole in the workpiece, the cone moves downwardly and the outer surfaces of the inserts engage the top edge or end of the hole. Each insert makes point contact with the workpiece which is the point where the convex outer surface of the insert engages the top edge of the hole. Hence, the cone rests firmly and is pressed against the workpiece by spring 42. As the operation continues, the cone remains rested against the end of the hole and the boring bar continues to move into the hole. However, at the time that the boring bit 10 reaches the workpiece, it starts to cut the workpiece around the hole upon which the cone rests. Thereafter, as the boring bit cuts away the workpiece around the hole, the cone rests upon the hole produced by the trueing bit and is firmly held in place by the rigidity of the boring bar and by the tension of spring 42.

As pointed out above, when plunger 44 and nose cone 30 are in the rest position, the supply of coolant is cut off by the positioning of plunger 44 against plug 9. However, when the nose cone engages the workpiece, it is held from moving downwardly, and the downward movement of the boring bar carries plug 9 downwardly away from plunger 44. That, in effect, moves plunger 44 upwardly away from plug 9 and opens the ports to bores 87 and 97, as explained above. The coolant then flows through the respective bores and passageways to the zone of the insert 29 and also to the cutting edges of boring bit 10 and trueing bit 16, as explained above.

It has been found that this is a very satisfactory arrangement for supplying coolant to the entire cutting operation and for supporting the nose cone. Operations may be carried on at a relatively high speed without galling. The terms "up" and "down" and related terms are used with reference to the drawings and with reference to the use of the tool when the boring bar is in the vertical position. However, it is understood that the boring bar may be used in other positions and the operation will be as described.

As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in a limiting sense.

I claim:

1. A boring tool which is adapted to cut away the side wall of an original hole in a workpiece and which comprises, the combination of, a boring bar having a tool end which is adapted to project into an original hole in a workpiece while it is supported at its other end, a boring bit rigidly mounted upon said tool end of said boring bar and presenting a cutting edge which extends radially through a boring zone from a minimum radius which is less than the minimum radius of said original hole to a maximum radius which is the radius of the final hole which is being bored, a nose cone slidably mounted to move axially upon said boring bar, said nose cone including a plurality of elongated contact portions which converge and present bearing surfaces which are along a cone frustrum which has a minimum radius which is less than the minimum radius of said original hole and a maximum radius which is greater than the maximum radius of said original hole whereby said bearing surfaces are adapted to be projected against and rest upon the end of said original hole, and resilient means resiliently urging said nose cone longitudinally of said boring bar toward a rest position wherein a portion of said bearing surfaces is in leading relationship with respect to said boring bit, said resilient means permitting said boring bar to be projected longitudinally against the action of said resilient means to a cutting position wherein the cutting edge of said boring bit intersects the cone frustrum of said bearing surfaces and wherein said bearing surfaces are resiliently nested in said original hole.

2. A boring tool as described in claim 1 wherein said boring bar has an axial bore, and wherein said resilient means is a coil spring axially positioned within said bore, and means extending radially through slots in said boring bar and mechanically connecting said nose cone to said spring, and wherein said boring bar includes passages which direct coolant from said axial bore to the cutting edge of said boring bit and valve means to cut off the flow of coolant when said nose cone moves to said rest position.

3. A boring tool as described in claim 1, wherein each of said contact portions is a carbide strip having a convex outer surface which is a segment of a cylinder.

4. A boring bar as described in claim 3 which includes passageways to deliver coolant to the zone of said contact portions including an annular chamber along the inner surface of said nose cone and passageways extending outwardly therefrom.

5. In a boring tool of the character described wherein a nose cone rests upon the end of an original hole and a boring bit cuts away the wall of the workpiece at the periphery of the hole, that improvement which comprises means to supply coolant to the workpiece within the zone of the boring operation, and valve means which is closed and opened by relative movement between the nose cone and the boring bit to control the flow of coolant.

6. The improvement as described in claim 5 wherein said valve comprises a plunger and spring means urging said plunger toward a closed valve position, means connecting said plunger to said nose cone to be moved therewith.

7. The improvement as described in claim 5 wherein said boring tool includes a boring bar and operating assembly resiliently urging said nose cone toward the original hole, and wherein said valve means is formed by said operating assembly.

8. The improvement as described in claim 7 wherein said boring bar has a central passageway through which coolant is supplied and wherein said operating assembly includes a plunger which slides in said passageway, and wherein said nose cone has internal passageways which extend from adjacent said valve means to the lower end of the nose cone.

9. The improvement as described in claim 8 wherein said internal passageways include slots extending axially of the nose cone on an inner surface thereof and arcuate slots connected thereto, and wherein said nose cone has a plurality of contacting portions which are arcuately positioned and provide point contacts with the workpiece around the end of the original hole, and wherein the coolant is delivered from said arcuate slots to zones between said contact portions.

10. In a boring tool having a boring bit which is mounted upon a boring bar and which is adapted to enlarge the size of a hole and wherein there is a nose cone with a frusto-conical end structure which is adapted to rest in the hole, that improvement which comprises providing a plurality of elongated inserts on said end structure which converge into the end of the hole and which provide contact with the edge of the hole, each of said inserts having a convex surface whereby it makes substantially a point contact with said edge.

11. The improvement as described in claim 10 which includes means to supply coolant through the boring bar to the workpiece at the nose cone, and valve means which is opened by the movement of the nose cone and which cuts off the supply of coolant when the nose cone is in a rest position.

No references cited.

WILLIAM W. DYER, JR., *Primary Examiner.*

GERALD A. DOST, *Assistant Examiner.*